United States Patent [19]

Heubeck

[11] Patent Number: 4,470,811

[45] Date of Patent: Sep. 11, 1984

[54] DEVICE FOR STORING DENTAL HANDPIECES

[75] Inventor: Erich Heubeck, Bensheim, Fed. Rep. of Germany

[73] Assignee: Siemens Aktiengesellschaft, Berlin & Munich, Fed. Rep. of Germany

[21] Appl. No.: 403,488

[22] Filed: Jul. 30, 1982

[30] Foreign Application Priority Data

Aug. 6, 1981 [DE] Fed. Rep. of Germany ....... 3131235

[51] Int. Cl.[3] ............ A61C 1/14

[52] U.S. Cl. ............ 433/78; 433/108

[58] Field of Search ............ 433/28, 77, 78, 108, 433/109; 254/390, 391, 416, 417

[56] References Cited

U.S. PATENT DOCUMENTS

| | | | |
|---|---|---|---|
| 1,360,778 | 11/1920 | Neel | 433/108 X |
| 2,363,353 | 11/1944 | Parker | 254/390 |
| 2,738,938 | 3/1956 | Benson et al. | 242/157.1 |
| 3,427,719 | 2/1969 | Gordon et al. | 433/78 |
| 4,075,761 | 2/1978 | Behne et al. | 433/126 X |
| 4,209,908 | 7/1980 | Fleer | 433/78 |
| 4,251,211 | 2/1981 | Plowman et al. | 433/77 X |

FOREIGN PATENT DOCUMENTS

| | | | |
|---|---|---|---|
| 2307515 | 11/1976 | France | 433/77 |
| 1429223 | 3/1976 | United Kingdom . | |

*Primary Examiner*—Robert P. Swiatek

[57] ABSTRACT

The present invention is directed to a device for storing a dental handpiece, which has a supply hose connected to one end which supply hose hangs freely in a loop-like fashion below the stored handpiece when the handpiece is in a stored position. The device uses a guidance roller and either a U-shaped element or a second roller to guide the hose during movement of the handpiece from a stored position to an extended position and either the second roller or U-shaped element coact with the first roller to form a socket for receiving the handpiece and providing a first or upper storage position. The device can also include a second U-shaped member which receives the handpiece and holds it in a second storage position.

11 Claims, 5 Drawing Figures

DEVICE FOR STORING DENTAL HANDPIECES

BACKGROUND OF THE INVENTION

The present invention is directed to a device for supporting a dental handpiece, which has one end connected to a supply hose and which device while supporting the handpiece in a storage position has the hose hanging freely in a loop configuration beneath the storage position of the handpiece.

It is known in dental devices to both deposit the handpiece in such a manner that the supply hose hangs freely in a loop-like configuration beneath the stored or deposited handpiece as well as depositing the handpiece in such a manner that the supply hose can be drawn through an inlet into a storage housing by means of a retraction or take-up device. Examples of take-up or retraction devices are spring-loaded levers or movable take-up drums. One example of this type of device is disclosed in British patent specification No. 1,429,223, which was based on German patent application No. P 22 21 130.

An advantage of a device in which the supply hose is retracted into a housing as the handpiece is being stored is that the handpiece can be returned to its storage position practically blindly. For example, the user does not need to carefully and precisely aim the handpiece as it is being moved into a storage socket since the retracting or take-up mechanism for the hose will pull the handpiece into the socket. However, known devices with a retractible supply hose do have the problem that the retraction device provided in the form of a special hose drum or a pivot lever with various deflection rollers, etc. are relatively technically involved and moreover are not maintenance-free and not wear-free. Another disadvantage is that the take-up force for retracting the hose into the storage position must be dimensioned relatively large in order to be able to return all of the hose to the housing when the handpiece is not in use. This relatively high take-up force loads the handpiece when it is removed from the device and is annoying to the user. It has been suggested to provide a catch device, which can be actuated to stop the application of this force; however, such an arrangement of a catch device increases the cost of the storage device and is not easily actuated when using the handpiece In comparison to the devices with retractible hoses, the handpiece storage device, which has the hose being allowed to hang freely in a loop-like configuration, has significant advantages of being considerably simpler in structure. In addition, this second type of device does not require maintenance of the catch devices and the retraction or take-up devices and no disruptive take-up forces need be overcome when pulling the hose out of the housing. However, the second type of device does have the disadvantage that the handpiece must be carefully guided into the storage socket which is usually designed as a slotted ring open toward the bottom and thus the handpiece cannot be put back blindly.

SUMMARY OF THE INVENTION

The present invention is directed to providing a specific device for supporting a dental handpiece, which has one end connected to a supply hose, and which device allows the hose to hang freely down in a loop beneath the rest or storage position of the handpiece and requires relatively low technical outlay. In addition, the device of the present invention is largely maintenance-free and wear-free and achieves the advantages of known arrangements which are provided with the additional complicated retracting device. For example, the device of the present invention enables a substantially blind return of the handpiece and the supply hose.

To achieve these objects, the present invention is directed to an improvement to a device for supporting a dental handpiece having one end connected to a supply hose, said device having storage means for supporting each handpiece in a storage position with the supply hose hanging freely in a loop below the storage position of the handpiece. The improvement comprises said storage means for each handpiece includes a hose guidance roller having a running surface being mounted for rotation on an axle, and means for preventing the hose from jumping off the running surface of the roller comprising a member mounted at a distance from the running surface which distance corresponds to approximately the diameter of the hose, said means for preventing said roller coacting to form a socket for receiving the one end of the handpiece when the handpiece is placed in said storage means. The member can be either a U-shaped element or a second roller which is mounted for rotation on a second axis spaced from the axis of the axle. This U-shaped element or second roller not only cooperates with the first-mentioned roller to form a socket for receiving the one end of the handpiece but also serves as a support element for the withdrawn hose in order to make a dragfree hose removal of the handpiece possible without any increasing resisting forces.

The proposed solution is particularly distinguished by the uncomplicated technical outlay that is practically maintenance and wear-free. Moreover, the proposed device is extremely price-favorable as a result of the relatively simple structure. Particular advantages can be achieved when the supply hose already exhibits a certain self-stretching property and is additionally provided with a spring-elastic core disposed in an empty channel of the hose. This core guarantees a uniformly neutral sag of the hose in the non-used or stored position and moreover promotes the necessary retraction of the hose. The spring-elastic core is preferably a flexible shaft with two or more springs being either wrapped in different directions on each other and on a core or just on each other. With such a shaft, the particular advantage is achieved that due to the weight of hose itself on the one hand and additional weight of the inserted core and the forces of the elastic-spring core, a practically moment compensating deposit of the handpiece is made possible. In using the above mentioned spring-elastic core the hose guidance means may including a socket having a slide face with high/sliding properties and low sliding friction for receiving the one end of the handpiece when the handpiece is placed in said storage means and for permitting the hose to glide very slightly when taking out or placing in said handpiece with regard to said storage means. Another advantages is that practically no detention is necessary.

DESCRIPTION OF THE PREFERRED EMBODIMENTS

Figure 1:
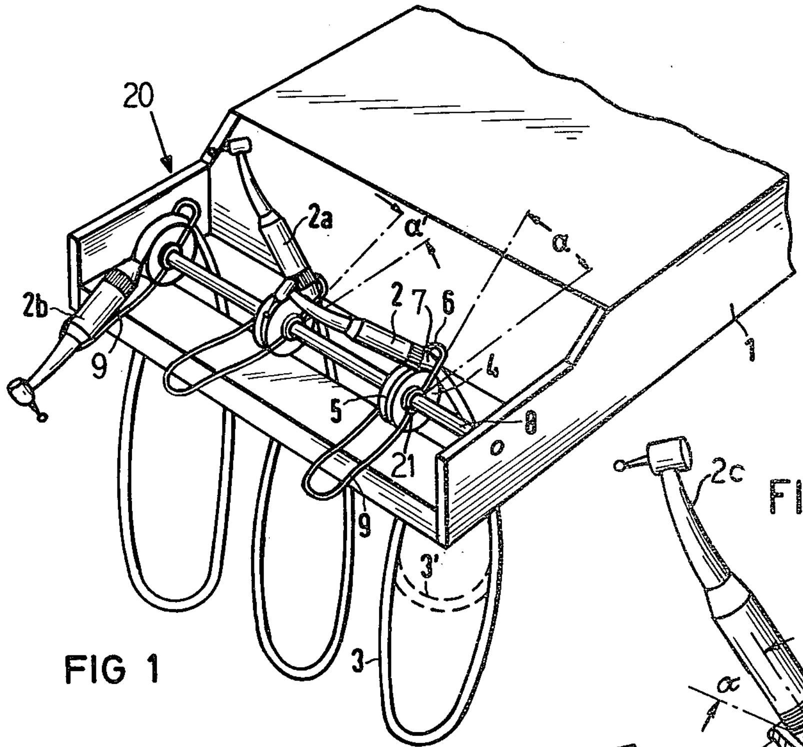
FIG. 1 is a perspective view of a device for supporting a plurality of dental handpieces in a storage position.

The principles of the present invention are particularly useful in a dental handpiece storage device, which is generally indicated at 20 in FIG. 1 and includes a housing 1 in which three handpieces 2, 2a and 2b are supported. For the purpose of a greater clarity, the handpieces are disposed next to one another with an exaggerated spacing. However, the spacing between the individual handpieces in general practice would be considerably less so that at least five or six handpieces could be disposed in the same given housing width. It should be noted that each of the handpieces is supported in the same manner and therefore the description in greater detail, which follows hereinafter, will be with regard to the dental handpiece 2.

For the purpose of providing storage means for supporting the handpiece 2 as well as providing guidance for the supply hose 3 which is connected at one end 7 of the handpiece 2 so that the hose 3 can hang freely down in the manner of a loop with the other end being connected to a connecting box in the housing 1, the device 20 for each handpiece has a guidance roller 4, which has a running surface 5 which is preferably in the form of a groove, mounted for rotation on a common axle 8. The device 20 also includes means for preventing the hose from leaving the groove 5 or jumping off of the roller 4 which means is illustrated as a U-shaped bracket or element 6 whose legs extend from a bight and alongside of the roller 4 and are mounted by bearing elements 21 on the axle 8. The bight of the bracket 6 is spaced from the surface 5 a distance slightly greater than the diameter of the hose 3 so that the hose is prevented from jumping off of the roller 4 or out of the groove 5 during removal of the dental handpiece from the storage position. In addition, the bracket 6 and the roller 5 form a socket for supporting the one end 7 of the handpiece 2 when it is placed in the storage or rest position.

The guidance roller or first roller 4 is freely rotatable around the axle 8. The rate of this rotation can be suitably adjusted by means of suitable friction elements. The bracket 6 is independently rotatable around the roller 4 and is likewise mounted by bearing elements 21 on the axle 8 with a certain amount of friction so that the inclined attitude of the bracket relative to the plane of reference can be varied. For example, see the angle $\alpha$ of the bracket 6 of the handpiece 2 and the angle $\alpha'$ for the bracket of the handpiece 2a. By changing this angle, it is possible as illustrated by the handpieces 2 and 2a to have the storage angle changed and thus to achieve a certain staggering of the handpieces as illustrated.

The bracket 6, which is made of wire, is provided with a continuation member or element 9 which is also a U-shaped member and provides a spoon-shaped receiving surface to form an alternate or second storage position for receiving a handpiece, which position is shown by handpiece 2b in FIG. 1. This alternate or second storage position allows the handpiece to be placed with the grip part rested in the spoon-shaped configuration. In particular, the simple construction of both the bracket 6 and the continuation element or second U-shaped member 9 enables them to be bent out of wire.

Figure 2:
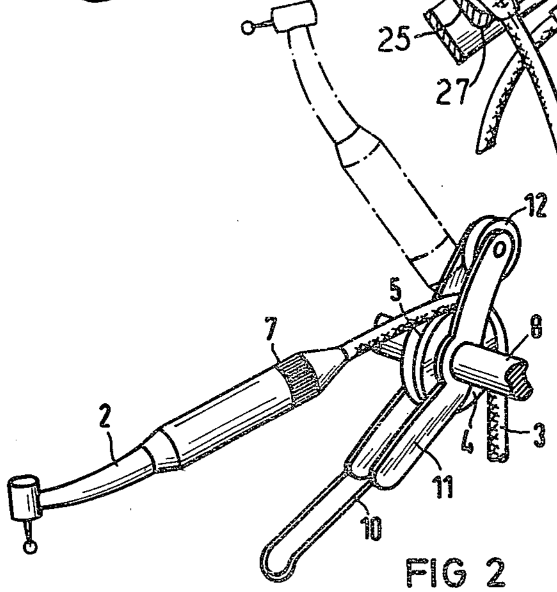
FIG. 2 is an enlarged perspective view of an embodiment of a storage device for a single dental handpiece.

An embodiment of the device is illustrated in FIG. 2 and includes a second U-shaped member 10, which is formed out of wire, and the means for preventing being a second roller 12 mounted for rotation on a second axis in a pair of support arms 11. The pair of support arms 11, as illustrated, are mounted for rotation on the axle 8 and cooperate with the roller 4 and the second roller 12 to guide the hose as the handpiece 2 is being withdrawn from the storage position. The roller 12 and the roller 5 along with the arms 11 form a socket for receiving the end 7 of the handpiece 2 when placed in a first storage position, as illustrated in FIG. 1. As with the U-shaped element 6, the roller 12 is positioned so that the spacing between the two roller surfaces is greater than the diameter of the hose 3.

As in the previous embodiment, the two support arms 11 can be rotated to different positions to change the storage position of the handpiece. Since the U-shaped member or bracket 10 is secured to these arms 11, it will also move with the arms when changing this position.

The first handpiece storage position, which is formed by the guidance roller 4 and either the bracket 6 or the cooperating roller 12 and the second handpiece rest or storage position, which is formed by the projection U-shaped element 9 or the U-shaped element 10, offer the possibility of different staggerings of the individual instruments of the plurality of instruments which are arranged one next to the other in the housing 1. As a result, the accessibility for the user is improved particularly given a very tight and compact disposition of the individual instruments.

Figure 3:
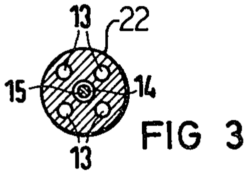
FIG. 3 is a cross-sectional view of a hose preferably utilized with a dental handpiece of the present invention.
Figure 4:
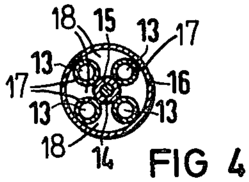
FIG. 4 is a cross-section of an embodiment of the hose preferably used in dental handpieces of the present invention.

As can be seen from the cross-sectional views of both FIGS. 3 and 4, the hose can be a multi-channel hose. As shown in FIG. 3, the hose is a single tube 22 with a plurality of channels 13 for conducting different agents such as water and air and can have an empty channel 14 in the center in which a spring-elastic core 15 is provided. The spring-elastic core 15 is preferably a flexible shaft or biaxial shaft in which two or more springs are either wrapped in different directions on each other and on a core or if no core is provided just on each other. The spring-elastic core 15 can extend over the entire length of the hose; however, in order to improve the manipulation of the handpiece, the elastic-spring core preferably extends only up to the proximity of the connection of the hose to the one end 7.

In addition to the already existing self-stretching forces, another force, which attempts to place the hose in a stretched position, additionally influences the hose. This additional stretching force acts two different ways on the hose. For example, for both a hose for a stored handpiece as well as for a handpiece which is partially removed from the storage position, which hose will have the position 3' of FIG. 1 or for a hose that is in an entirely withdrawn state, this additional stretching force will cause the hose to uniformly sag toward the outside with a slight arc. This force will also lead to a righting force or moment which, given a partially or entirely withdrawn supply hose, suffices to return the hose to its initial position. As a result of the central disposition of the spring-elastic core 5, a uniformly neutral sag of the hose is guaranteed. An eccentric disposition of the spring-elastic core, for example, when only one agent line or channel is to be provided, is also conceivable.

An embodiment of the supply hose is illustrated in FIG. 4 and is composed of a plurality of tubes 17 providing a plurality of channels 13 which tubes 17 are arranged around a centrally disposed channel 14 containing a spring-elastic core 15. These plurality of tubes 17, which are preferably arranged in a clover-leaf manner, are provided with a circular outer sheath or cladding 16. Under certain conditions, this circular sheath 16 is desirable for a hygienic point of view in order to be able to easily clean the hose. The elastic-spring core can also be disposed at one of the other cavities such as in the cavities 18 which are channel-like and are formed between the sheath 16 and the individual tubes 17. Thus, the empty channel need not be formed by an unused channel in one of the tubes and can be formed by the cavity or channel 18 between the various tubes.

By means of employing the drawn-in spring-elastic core, a positional independence in the withdrawal direction of the supply hose can be achieved. Since the retraction ensues over two complementary functions, namely, as a result of the weight of the hose together with the weight of the spring-elastic core on one hand and also as a result of the righting moment or force of the spring-elastic core, a practically moment-compensated deposit of the handpiece is achieved.

In conclusion, let it also be noted that while the embodiments of FIG. 1 and FIG. 2 have the secondary loop 9 or 10 mounted to rotate with either the U-shaped element 6 or the roller 12, it is also possible that these U-shaped members 9 or 10 can be provided with separate bearings for rotatably supporting them on the axle 8 so that the upper or first rest position formed by the roller 5 and either the U-shaped member 6 or the roller 12 and the second rest position formed by the spoon-shaped member 9 or 10 can be individually adjusted relative to each other.

Figure 5:
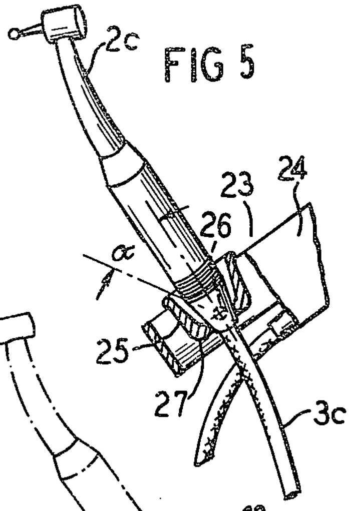
FIG. 5 is a partial side view with portions broken away for illustration of another embodiment of a storage device.

Another embodiment of a storage device is illustrated in FIG. 5. The storage device, generally indicated at 23 includes a housing 24, similar to the housing 1 in FIG. 1, in which one or more handpieces 2*c* are supported. The one end of the handpiece 2*c* is supported in the storage position by a socket 25, which is turnably arranged on the housing 24 by an axle 26, permitting the handpiece to be placed in different positions with different angles of inclination as illustrated in FIG. 1. The socket 25 is made from a material with high sliding properties and low sliding friction, such as PTFE, and has an inner slide surface with a well rounded (ball-like cross-section) end 27, so that there are no sharp edges and places when the hose 3 slides over the inner face, when the handpiece is withdrawn from the storage device or put into the storage device.

Although various minor modifications may be suggested by those versed in the art, it should be understood that I wish to embody within the scope of the patent granted hereon, all such modifications as reasonably and properly come within the scope of my contribution to the art.

I claim:

1. In a device for supporting a dental handpiece having one end connected to a supply hose, said device having storage means for supporting each handpiece in a storage position with the supply hose hanging freely in a loop below the storage position of the handpiece, the improvements comprising said storage means for each handpiece including a hose guidance roller having a running surface and being mounted for rotation on an axle and means for preventing the hose from jumping off the roller comprising a second roller and means for mounting said second roller for rotation about a second axis being spaced from the axis of the axle with the surface of the second roller being at a distance from the running surface, which distance corresponds approximately to a diameter of said hose, said means for preventing and said roller coacting to form a socket for receiving the one end of the handpiece when the handpiece is placed in said storage means, said means for mounting the second roller mounting the second axis to rotate around the axis of said axle and supporting a continuation member forming a second support part for alternately accepting the handpiece with the hose extending through said socket.

2. In a device according to claim 1, wherein said continuation member is mounted for rotation around the axle.

3. In a device according to claim 1, which includes means for aiding in retracting of the supply hose to the loop configuration, said means for aiding comprising the supply hose having at least one channel containing a spring-elastic core, said spring-elastic core being designed to urge said hose to a longitudinally stretched condition.

4. In a device according to claim 3, wherein the supply hose includes a plurality of channels, said channel containing the spring-elastic core being disposed centrally in the plurality of channels with the remaining channels being agent-conveying channels.

5. In a device for supporting a dental handpiece having one end connected to supply hose, said device having storage means for supporting each handpiece in a storage position with the supply hose hanging freely in a loop below the storage position of the handpiece, the improvements comprising said storage means for each handpiece including a hose guidance roller having a running surface being mounted for rotation on an axle, means for preventing the hose from jumping off the roller, and a continuation member, said means for preventing comprising a U-shaped element having a bight with legs extending therefrom and alongside of the roller, said legs being mounted for rotation on said axle with the bight being mounted at a distance from the running surface, which distance corresponds approximately to a diameter of said hose, said bight and said roller coacting to form a socket for receiving the one end of the handpiece when the handpiece is placed in said storage means and said continuation member being a U-shaped member and being mounted for rotation on said axle to form an alternate storage position for the handpiece while the hose extends between a bight of the U-shaped element and roller.

6. In a device according to claim 5, wherein the U-shaped member is connected to said U-shaped element.

7. In a device according to claim 6, wherein both the U-shaped element and U-shaped member are formed of a wire bracket having the legs interconnected to a common bearing received on the axle.

8. In a device according to claim 5, which includes means for aiding in retracting of the supply hose to the loop configuration, said means for aiding comprising the supply hose having at least one channel containing a spring-elastic core, said spring-elastic core being designed to urge said hose to a longitudinally stretched condition.

9. In a device according to claim 8, wherein the supply hose includes a plurality of channels, said channel containing the spring-elastic core being disposed centrally in the plurality of channels with the remaining channels being agent-conveying channels.

10. In a device for supporting a dental handpiece having one end connected to a supply hose, said device having storage means for supporting each handpiece in a storage position with the supply hose hanging freely in a loop below the storage position of the handpiece, the improvements comprising said storage means for each handpiece including hose guidance means forming a socket for receiving the one end of the handpiece when the handpiece is placed in said storage means and preventing the hose from jumping off, said hose guidance means having a slide face made of a material with high sliding properties, said storage means including means for aiding in retracting of the supply hose to the loop configuration, said means for aiding comprising the supply hose having a plurality of channels with a channel being centrally disposed in the plurality of channels containing a spring-elastic core and the remaining channels being agent-conveying channels, said spring-elastic core being designed to urge said hose to a longitudinally stretched condition.

11. In a device according to claim 10, wherein the spring-elastic core is a flexible cable with two or more springs being either wrapped in different directions on each other and on a core or just on each other.

* * * * *